United States Patent
Lee

(10) Patent No.: US 11,586,900 B2
(45) Date of Patent: Feb. 21, 2023

(54) TRAINING ALGORITHM IN ARTIFICIAL NEURAL NETWORK (ANN) INCORPORATING NON-IDEAL MEMORY DEVICE BEHAVIOR

(71) Applicant: MACRONIX INTERNATIONAL CO., LTD., Hsinchu (TW)

(72) Inventor: Ming-Hsiu Lee, Hsinchu (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 359 days.

(21) Appl. No.: 16/853,014

(22) Filed: Apr. 20, 2020

(65) Prior Publication Data

US 2021/0326685 A1    Oct. 21, 2021

(51) Int. Cl.
| | |
|---|---|
| *G06F 11/14* | (2006.01) |
| *G06N 3/08* | (2006.01) |
| *G06N 3/063* | (2006.01) |
| *G06N 3/04* | (2023.01) |

(52) U.S. Cl.
CPC ............ *G06N 3/0635* (2013.01); *G06N 3/04* (2013.01); *G06N 3/08* (2013.01)

(58) Field of Classification Search
CPC .......... G06N 3/063; G06N 3/08; G06N 3/084; G06F 11/1476
See application file for complete search history.

(56) References Cited

U.S. PATENT DOCUMENTS

| | | |
|---|---|---|
| 5,148,045 A | 9/1992 | Oyanagi |
| 5,247,606 A | 9/1993 | Tam |
| 5,581,659 A | 12/1996 | Takatori |
| 11,022,720 B2* | 6/2021 | Sarwat .................. H02J 3/381 |
| 2007/0028076 A1* | 2/2007 | Wezelenburg ...... G06F 9/30036 712/22 |
| 2009/0034782 A1* | 2/2009 | Gering .................. G06V 20/00 382/100 |
| 2017/0213148 A1 | 7/2017 | Mytkowicz et al. |
| 2019/0303787 A1 | 10/2019 | Dube et al. |
| 2020/0192971 A1 | 6/2020 | Lue et al. |

(Continued)

OTHER PUBLICATIONS

Abadi et al., TensorFlow: Large-Scale Machine Learning on Heterogeneous Distributed Systems (Preliminary White Paper), Nov. 9, 2015, 19 pages.

(Continued)

*Primary Examiner* — Caridad Everhart
(74) *Attorney, Agent, or Firm* — Haynes Beffel & Wolfeld LLP

(57) ABSTRACT

Machine learning of model parameters for a neural network using a computing system is provided, that produces error-aware model parameters. An iterative process to converge on trained model parameters to be applied in the inference engine, includes applying a sequence of input training data sets to a neural network to produce inference results for the sequence using a set of model parameters in the neural network combined with factors based on a model of non-ideal characteristics of target memory to provide a training set of model parameters. An inference engine using the target memory technology to store the model parameters can have more stable results across a large number of engines.

20 Claims, 5 Drawing Sheets

(56) References Cited

U.S. PATENT DOCUMENTS

2021/0150348 A1* 5/2021 MacKenzie ............ A61B 5/384

OTHER PUBLICATIONS

LeCun et al., "Deep Learning," Nature, vol. 521, May 28, 2015, 9 pages.
Lin et al., "Performance Impacts of Analog ReRAM Non-ideality on Neuromorphic Computing", IEEE Transactions on Electron Devices, vol. 66, No. 3, Mar. 2019, pp. 1289-1295.
Mohanty et al., "Random Sparse Adaptation for Accurate Inference with Inaccurate Multi-level RRAM Arrays," IEEE IEDM 17, Dec. 2017, 143-146.

* cited by examiner

TRAINING ALGORITHM IN ARTIFICIAL NEURAL NETWORK (ANN) INCORPORATING NON-IDEAL MEMORY DEVICE BEHAVIOR

BACKGROUND

Field

The present invention relates to improvements in technology implementing artificial neural networks, and particularly such networks comprising memory devices characterized by non-ideal memory device behavior.

Description of Related Art

Artificial neural network ANN technology has become an effective and important computational tool, especially for the realization of artificial intelligence. Deep neural networks are a type of artificial neural networks that use multiple nonlinear and complex transforming layers to successively model high-level features. Deep neural networks provide feedback via backpropagation which carries the difference between observed and predicted output to adjust model parameters. Deep neural networks have evolved with the availability of large training datasets, the power of parallel and distributed computing, and sophisticated training algorithms. ANNs of all kinds, including deep neural networks, have facilitated major advances in numerous domains such as computer vision, speech recognition, and natural language processing.

Convolutional neural networks (CNNs) and recurrent neural networks (RNNs) can be used in, or as components of, deep neural networks. Convolutional neural networks have succeeded particularly in image recognition with an architecture that comprises convolution layers, nonlinear layers, and pooling layers. Recurrent neural networks are designed to utilize sequential information of input data with cyclic connections among building blocks like perceptrons, long short-term memory units, and gated recurrent units. In addition, many other emergent deep neural networks have been proposed for various contexts, such as deep spatio-temporal neural networks, multi-dimensional recurrent neural networks, and convolutional auto-encoders.

Training neural networks involves optimization of the weight model parameters in each layer, which gradually combines simpler features into complex features so that the most suitable hierarchical representations can be learned from data. A single cycle of the optimization process can be understood as follows. First, given a training dataset, the forward pass sequentially computes the output in each layer and propagates the function signals forward through the network. In the final output layer, an objective loss function (also known as a cost function), measures error between the inferenced outputs and the given labels linked to input data that represent expected results. A backward pass through the layers of the neural network uses the chain rule to backpropagate error signals and compute gradients with respect to all weights throughout the neural network. Finally, the weight parameters are updated using optimization algorithms often based on stochastic gradient descent. Whereas batch gradient descent performs parameter updates for each complete dataset, stochastic gradient descent provides stochastic approximations by performing the updates for each small set of data examples. Several optimization algorithms stem from stochastic gradient descent. For example, the Adagrad and Adam training algorithms perform stochastic gradient descent while adaptively modifying learning rates based on update frequency and moments of the gradients for each parameter, respectively.

In some applications, the training of an ANN system is done using high-speed computing systems using distributed or parallel processors, and the resulting set of parameters is transferred to a memory in a computational unit, referred to herein as an inference engine, implementing that ANN to be used for inference-only operations. However, the behavior of the memory cells in the inference-only machine can be non-ideal, particularly in some types of nonvolatile memories, because of programming error, memory level fluctuations, noise and other factors. This non-ideal behavior of the memory cells storing the parameters can cause computing errors in the inference engine applying the parameters. These computing errors, in turn, result in loss of accuracy in the ANN system.

One arithmetical function applied in ANN technology is a "sum-of-products" operation, also known as a "multiply-and-accumulate" operation. The function can be expressed in simple form as follows:

$$f(x_i) = \sum_{i=1}^{M} W_i x_i$$

In this expression, each product term is a product of a variable input $X_i$ and a weight $W_i$. The weight $W_i$ is a parameter that can vary among the terms, corresponding for example to parameters of the variable inputs $X_i$. ANN technologies can include other types of parameters as well, such as constants added to the terms for bias or other effects.

Efficient implementations of multiply-and-accumulate operations are desirable in both training and inference, and particularly in thin platform embodiments that can be deployed in the field. A variety of techniques is being developed to accelerate the multiply-and-accumulate operation. One technique is known as "computing-in-memory CIM", involving use of nonvolatile memory, such as resistive memory, floating gate memory, phase change memory and so on, arranged to store data representing the parameters of the computation, and provide outputs representing sum-of-products computation results. For example, a cross-point ReRAM array can be configured in a CIM architecture, converting an input voltage into current as a function of the electrical conductance of the memory cells in the array, and providing a sum-of-products operation using multiple inputs and one cross-point string. See for example, Lin et al., "Performance Impacts of Analog ReRAM Non-ideality on Neuromorphic Computing", IEEE TRANSACTIONS ON ELECTRON DEVICES, VOL. 66, NO. 3, MARCH 2019, pp. 1289-1295, which is incorporated by reference as if fully set forth herein.

It is desirable therefore to provide technology for improving ANN systems that utilize non-ideal memory to store parameters, including to store parameters generated during machine learning procedures.

SUMMARY

A technology is provided in which training of an ANN system is adapted to tolerate non-ideal behaviors of memory devices used by inference engines. As a result, the execution accuracy of the inference engine can be more stable over a wide variety of operating conditions, and over multiple different inference engines.

In one aspect, a method for machine learning of parameters for a neural more for computing system is provided, that uses training data sets with expected results. The method includes an iterative process to converge on trained parameters to be applied in the inference engine, that includes applying a sequence of input training data sets to a neural network to produce inference results for the sequence using a training set of parameters in the neural network combined with factors based on a model of characteristics of target memory. The inference results are analyzed by computing errors produced using the training set of parameters, between the expected results and the inference results for the sequence of input training data sets to produce a loss function. Also, the method includes applying a parameter update procedure using the loss function to update the set of parameters.

Combining the parameters during training with factors based on a model of characteristics of the target memory can result in trained parameters that can be applied to a large number of inference engines that produce stable and consistent results, more tolerant of errors arising due to non-ideal behavior of the memory in the different inference engines. Trained parameters implemented as described herein can be characterized as "error-aware" parameters.

A model of characteristics of the target memory can comprise factors that represent variability of the parameters resulting from differences in the target memory between target program states of the memory cells and output data of the memory cells. In some embodiments, the model factors can comprise randomized error factors within a distribution of errors derived from the model of the target memory.

A variety of update procedures can be utilized, including update procedures based on gradient descent algorithms, such as stochastic gradient descent used in ANN training systems.

A system is provided configured to execute machine learning methods as described herein. Also, a computer program product is provided comprising a non-transitory, machine-readable memory storing instructions configured to execute a method as described herein.

Also described is a device comprising logic to implement neural network operations (such as multiply and accumulate) over input data and a trained set of parameters; and memory storing the trained set of parameters operably coupled to the logic, the trained set of parameters having values computed using a training algorithm that compensates for characteristics of the memory.

Such a device can be part of an inference engine including parameter memory storing error-aware parameters. The inference engine can include one or more multiply-and-accumulate accelerators that rely on nonvolatile memory, or other types of non-ideal memory, to store parameters, including CIM-based accelerators.

Other aspects and advantages of the present invention can be seen on review of the drawings, the detailed description and the claims, which follow.

DETAILED DESCRIPTION

A detailed description of embodiments of the technology is provided with reference to the FIGS. 1-6.

Figure 1:
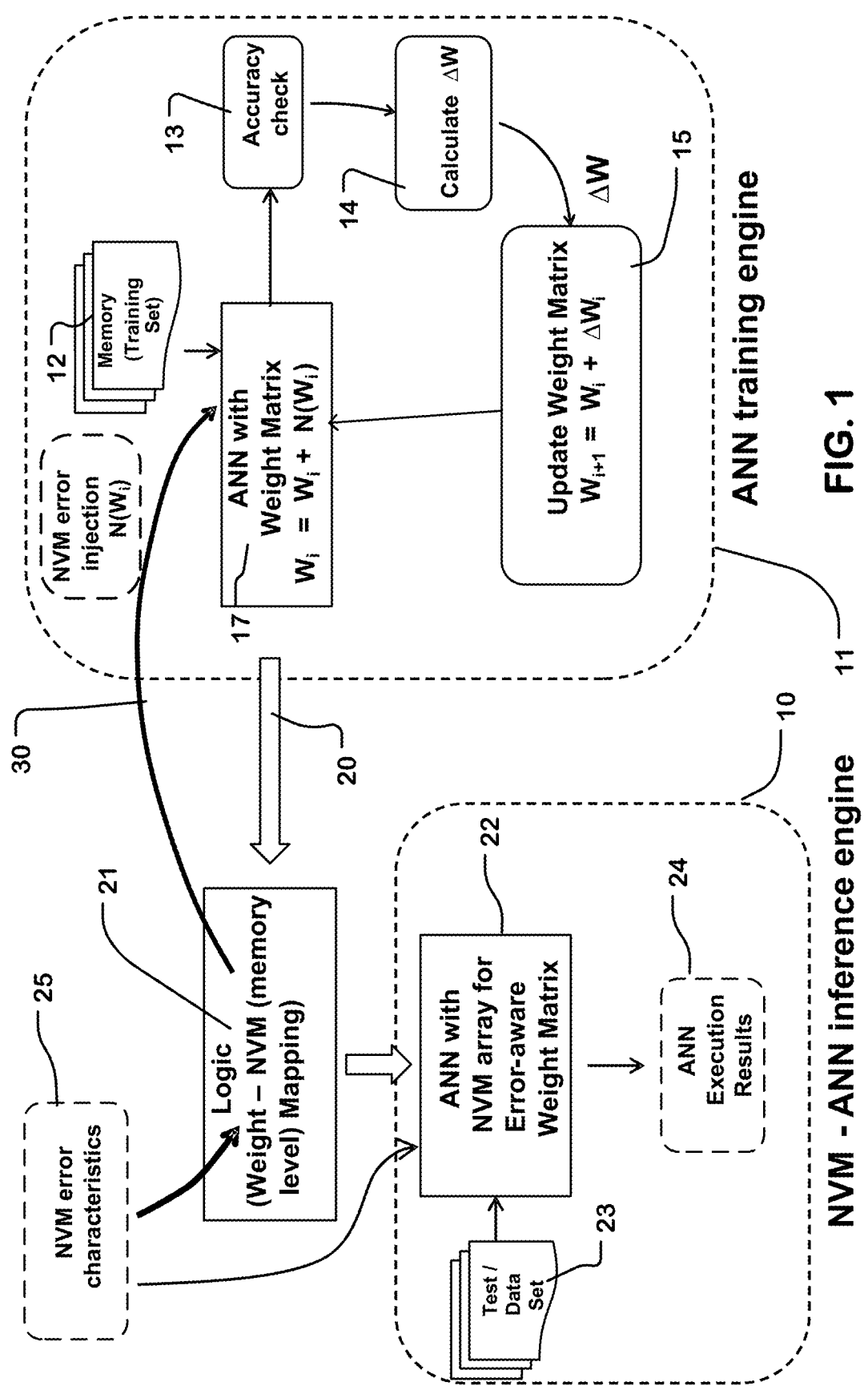
FIG. 1 illustrates an artificial neural network ANN system including a training system configured for error-aware training and an associated inference engine.

FIG. 1 illustrates an ANN system that includes an inference engine 10 and a training engine 11. The training engine 11 includes memory 12 storing a sequence of input training data sets labeled with expected results, and an artificial neural network ANN 17 which can be implemented using a programmed computer system, that executes using a set of parameters referred to in this diagram as a weight matrix Wi. At least some of the parameters in the set of parameters are combined with factors based on a model of characteristics of a target memory. In FIG. 1, the set including these combined parameters is referred to as a training set of parameters, as represented by a function of injecting (30) an error factor N(Wi) into the weight matrix, so that the weight matrix can be characterized by the function Wi=Wi+N(Wi). The factors based on a model of characteristics of the target memory can be stored in logic 21 that models the memory error characteristics 25 of a target memory comprising a nonvolatile memory array storing at least some of the parameters used by the ANN 22 in the inference engine 10. In this example, the target memory is a nonvolatile memory. In other examples, the target memory may be volatile memory such as DRAM.

The NVM-induced weight fluctuation model including the error factors N(Wi) is based on the noise characteristics and other characteristics of the NVM device.

The weight fluctuation model can be as complicate as real NVM behavior, or be approximated into only few parameters, or even become a constant distribution value.

The weight fluctuation can be injected 30 into the weight matrix in ANN 17 for all the tests in the training phase, or just for some of the tests to save training time.

For example, weight fluctuation injection 30 only occur at the beginning of the training phase, at the end of the training phase, or intermittently across the training phase. For another example, the weight fluctuation injection 30 can occur in some layers of a deep neural network, and not others. For example the weight fluctuation injection 30 can be used combinations found effective for a given model or type of non-volatile memory, such as in only a first layer, only a last layer, or only intermediate layers.

The nature of the weight matrix is based on the architecture of the ANN, including the number and the organization of the parameters in memory. The ANN 17 in the training engine 11 can be executed using a high-speed digital system, including processors such as graphics processor units GPU or field programmable gate array FPGA based systems, storing parameters using more ideal memory, such as SRAM during execution of the ANN 17. During execution of the training engine 11 for example, the parameters can be stored very accurately if desired for a particular implementation, using for example floating point representations using 16 to 64 bits, or even more accurate representations.

In training, the ANN 17 is executed using the training set of parameters over a plurality of training sets retrieved from the memory 12, and the results are applied to the accuracy check function 13 which can compute the loss function to perform a gradient descent algorithm such as stochastic gradient descent. Results of the accuracy check function 13 are utilized to compute an array of ΔW factors (14) to adjust the training set of parameters and to produce an updated weight matrix 15. The training engine loops back to the ANN 17 and uses the updated weight matrix 15 in an iterative fashion to produce a model comprising final trained set "error-aware" of model parameters.

The trained set of error-aware model parameters is transferred (20) to logic 21 to map the model parameters to the target memory utilized by the ANN in the inference engine 10.

During execution, input data sets 23 are applied to the ANN 22 in the inference engine 10, which uses the trained set of error-aware parameters to compute execution results 24. The ANN 22 can be implemented using CIM technologies or other types of technologies that rely on non-ideal memory to store the parameters. For example, in some embodiments, GPU or FPGA based inference engines include parameter stores that are implemented using a target memory comprising nonvolatile memory cells, and may be moved in and out of the nonvolatile memory in the field as needed by the computation resources.

The present technology can be applied using many types of target memory technologies in the inference engines, including nonvolatile memory technologies. Examples include floating gate devices, charge trapping devices (SONOS, . . . ), phase change devices, transition metal oxide resistance change devices (TMO ReRAM), conduction bridge resistance change devices, magnetoresistive devices and so on.

Figure 2:
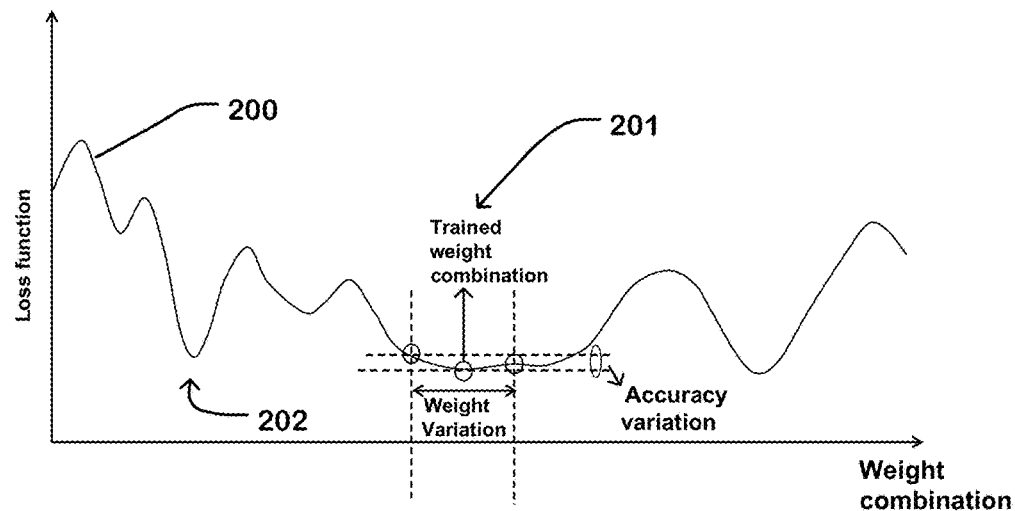
FIG. 2 is a graph heuristically illustrating error-aware training as described herein.

FIG. 2 is a graph illustrating operation of accuracy check function 13 for an error-aware training algorithm. The graph in FIG. 2 plots on line 200 loss function values versus the combinations of weights in the weight matrix applied, that results in the particular loss function value. As illustrated, the loss function fluctuates across peaks and valleys for the various weight combinations. Utilizing a training function as described herein, and algorithm minimizing the loss function using weight parameters combined with factors based on a model of the target memory, can cause the algorithm to converge on a trained weight combination 201 that lies in a relatively wide valley ("tub") in the plot, having a relatively large weight variation range over a relatively small accuracy variation range. Without combining the parameters with factors based on the non-ideal behavior of the target memory, the training function may converge on a parameter in a steep valley (e.g. 202) in the plot. A parameter in the steep valley 202 will be less stable over various implementations of an inference engine using the parameter, as the errors that arise because of the non-ideal behavior of the memory may result in very large accuracy variations.

As described above, the training algorithm can be modified to find "tubs" in the loss function by injecting factors that compensate for non-ideal behavior of the target memory. The modification of the training algorithm applied depends on the particular algorithm utilized. It is expected that a variety of mathematical techniques can be applied based on the teaching herein, to inject factors based on a model of the target memory into the procedures and achieve results that can improve inference engine technology.

Figure 3:
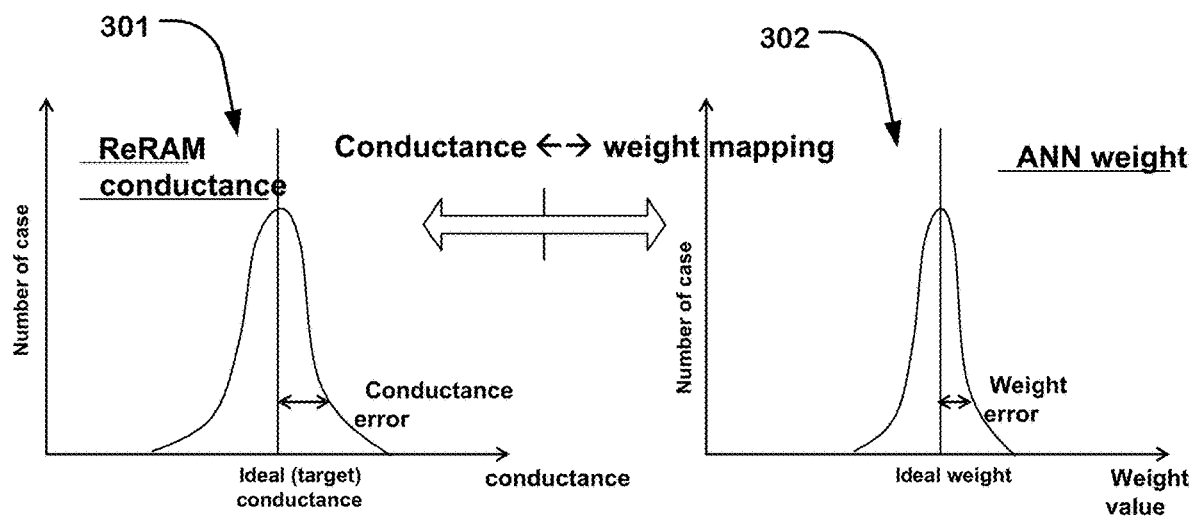
FIG. 3 illustrates a manner of determining factors used in a training system as described herein based on a model of a target memory.

FIG. 3 illustrates one way of translating non-ideal behavior of a target memory into factors that can be applied in the training algorithm. In the example in FIG. 3, a plot of conductance of ReRAM cells in a memory device which is programmed to represent a particular data value can have a relatively broad Gaussian-like distribution, where the distribution can represent a model of memory behavior 301. Ideal memory would have a very sharp distribution around the ideal or target conductance. To produce factors to be applied in training, this model of memory behavior 301 can be normalized and adjusted to produce a weight error factor 302 distribution. This weight error factor distribution can be combined with the parameters to be applied in the training engine in a random pattern using Monte Carlo approach in some examples.

The example shown in FIG. 3, based on a weight fluctuation model that varies within a narrow distribution, can be applied for some kinds of target memories, such as non-volatile memories, that having behaviors which cause parameters stored therein to fluctuate based on noise characteristics and programming accuracy. The weight fluctuation model can be as complicated as real memory behavior, can be approximated into only few parameters, or can even become a constant distribution value.

Examples of non-volatile memory for storage of the ANN model parameters include memory devices comprising floating gate memory cells charge trapping memory cells (SONOS, . . . ), phase change memory cells, transition metal oxide resistance change memory cells (TMO ReRAM), conduction bridge resistance change memory cells, etc. Preferably, the model parameters are stored in memory architectures supporting random access, examples of which include one transistor/one resistor 1T/1R ReRAM architectures, 3D cross point architectures and NOR flash architectures. The memory state of the non-volatile memory cells can be indicated by threshold voltage, resistance, conductance. The read-out of the non-volatile memory cells can be voltage or current. Weight fluctuations based on the characteristics of the NVM device used in the system is included in the training phase.

Embodiments of the non-volatile memory device can include memory arrays operated in an analog mode. An analog mode memory can be programmed to desired values in many levels, such as eight or more levels, that can be converted to digital outputs of multiple bits, such as three or more bits. Due to device physical characteristics there can be accuracy issues (from programming error, device noise . . . etc.) and resulting in memory level spread out, forming a distribution even for cells intended to have the same "value". To program an analog memory cell, the data can stored by simply applying a single program pulse. Also, a programming operation can use multiple programming pulses, or program-and-verify scheme to increase the programming accuracy by confining the value distribution (value error) into an acceptable range.

For example, an analog mode memory for example can use as high as 64-levels or 100-levels, which is effectively analog because such many-level memory operate with distributions of levels overlapping across neighboring memory states (for example a cell in an array may not be confidently read as level #56 or level #57 due to the level shift from error, noise, etc.). Errors due to level shifts and other factors may cause system performance degradation. Error aware training as described herein can improve performance in these situations.

Figure 4:
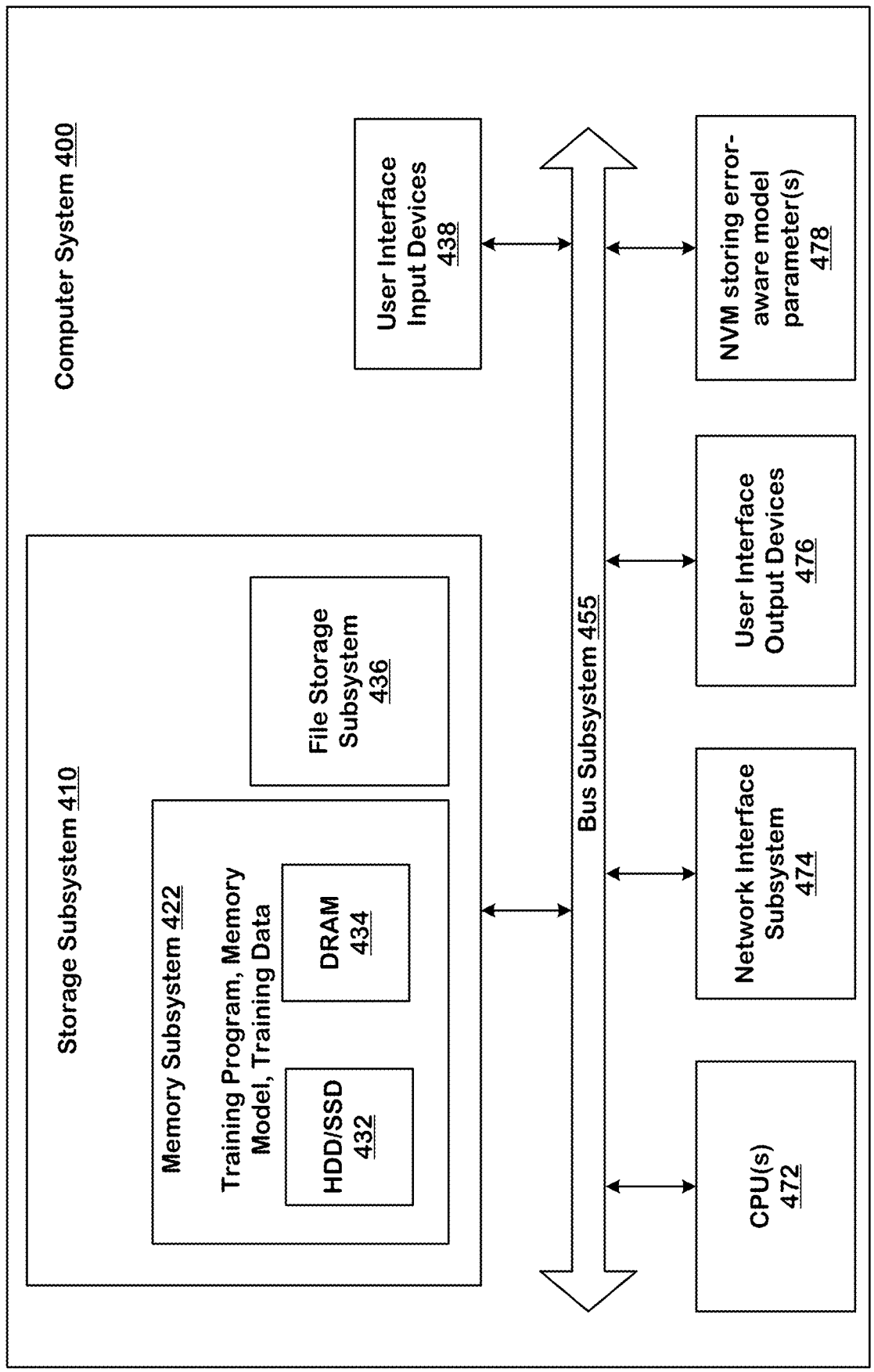
FIG. 4 illustrates a computer system configured for a training system and an inference engine as described herein.

FIG. 4 is a simplified block diagram of a computer system 400 that can be used to implement the technology disclosed. Computer system 400 includes at least one central processing unit (CPU) 472 that communicates with a number of peripheral devices via bus subsystem 455. These peripheral devices can include a storage subsystem 410 including, example, memory devices and a file storage subsystem 436, user interface input devices 438, user interface output devices 476, and a network interface subsystem 474. The input and output devices allow user interaction with computer system 400. Network interface subsystem 474 provides an interface to outside networks, including an interface to corresponding interface devices in other computer systems.

The storage subsystem 410 stores computer programs including a training program, a memory model and training data, in this example, used for training phase operations as described above. Storage subsystem 410 stores programming and data constructs, including ANNs specified using tools such as Keras and Tensorflow libraries (see, https://kerasio/getting-started/functional-api-guide/; and TensorFlow: Large-Scale Machine Learning on Heterogeneous Distributed Systems (Preliminary White Paper, Nov. 9, 2015)), that provide the functionality of some or all of the modules and methods described herein. In some embodiments, program and data components of the technology can be distributed in a network, that makes them accessible to, and in effect part of, the computer system 400.

User interface input devices 438 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 400.

User interface output devices 476 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 400 to the user or to another machine or computer system.

In one implementation, the neural networks are implemented using non-volatile memory 478 storing memory error-aware model parameters. The memory error-aware model parameters can be computed using the training program in the computer system 400. Non-volatile memory 478 can comprise analog mode memory.

Memory subsystem 422 used in the storage subsystem 410 can include a number of memories including a main random access memory (DRAM) 434 for storage of instructions and data during program execution and a hard disk drive and solid state drive (HDD/SSD) 432 in which fixed instructions and data may be stored. A file storage subsystem 436 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 436 in the storage subsystem 410, or in other machines accessible by the processor.

Bus subsystem 455 provides a mechanism for letting the various components and subsystems of computer system 400 communicate with each other as intended. Although bus subsystem 455 is shown schematically as a single bus, alternative implementations of the bus subsystem can use multiple busses.

Computer system 400 itself can be of varying types including a personal computer, a portable computer, a workstation, a computer terminal, a network computer, a television, a mainframe, a server farm, a widely-distributed set of loosely networked computers, or any other data processing system or user device. Due to the ever changing nature of computers and networks, the description of computer system 400 depicted in FIG. 4 is intended only as a specific example for purposes of illustrating the preferred implementations of the present invention.

Many other configurations of computer system 400 are possible having more or less components than the computer system depicted in FIG. 4.

A thin platform inference engine can include a processor such as CPU 472, such as a microcomputer, coupled with non-volatile memory 478 storing memory error-aware model parameters, and an input and output port for receiving inputs and transmitting outputs. The processor may include a LINUX kernel and an ANN program implemented in non-transitory memory, configured to use the memory error-aware model parameters, during inference operations.

A device used by, or including, an inference engine as described herein, comprises logic to implement ANN operations over input data and a trained set of model parameters, and memory storing the trained set of parameters operably coupled to the logic, the trained set of parameters comprising memory error-aware model parameters having values computed using a training algorithm that compensates for characteristics of the memory.

Figure 5:
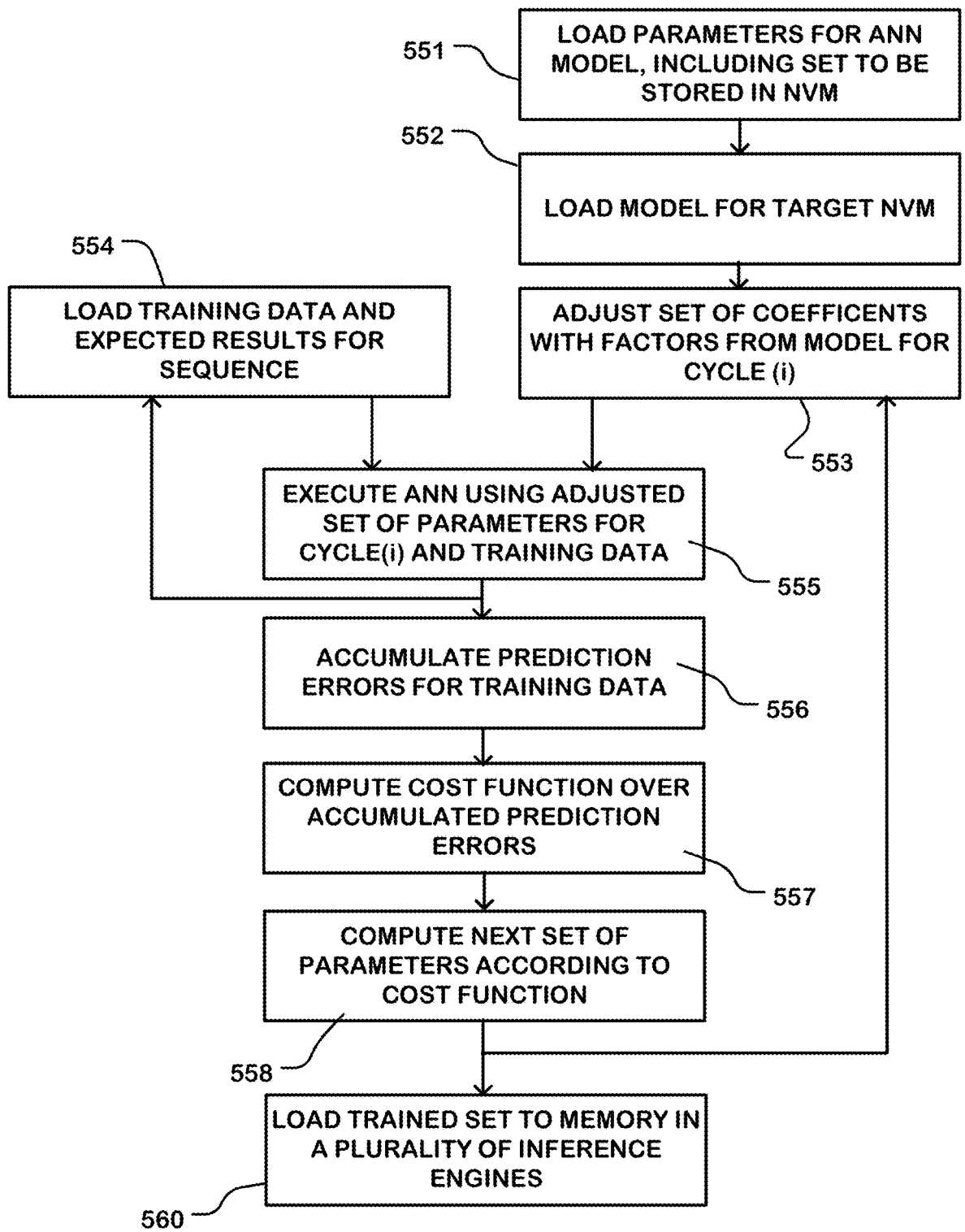
FIG. 5 is a simplified flowchart of a training algorithm executable by a system like that of FIG. 4 to produce error-aware parameters for an inference engine.

FIG. 5 is a flowchart illustrating a training program implemented using instructions of a computer program stored in the non-transitory memory of a system, such as a computer system 400 like that FIG. 4, or another types of systems that can utilize technology described herein (loop counting steps omitted). In this example flowchart, the training program includes loading parameters to the computing system for an ANN model, including a set of parameters to be stored in a nonvolatile memory or other type of target memory (551). The initial parameters can be set to default values in an organized memory in a manner matching the configuration set up by the computer program. Also, the program includes loading a model for the target nonvolatile memory (552), which can be represented by factors that can be injected into the training algorithm as discussed above. For example, for a given set of parameters to be stored in a nonvolatile memory array, the addresses of the parameters in the array can be determined in advance. The characteristics of the memory at the addresses of the parameters can be utilized to establish the model represented by factors to be injected in the training algorithm.

The training algorithm includes a process of adjusting the set of parameters to be stored in the target memory, using the factors from the model for a given cycle (cycle(i)) of the training algorithm (553). Also, the training data and expected results are loaded for the sequence of training data to be used in training the ANN (554).

The next block in the illustration represents executing the ANN using the adjusted set of parameters for cycle (i) across the training data or a subset of the training data (555). This cycle of executing the ANN using an adjusted set of parameters across the training data is repeated until all the training data for a particular segment of the training program is completed. In this example, the factors injected to model the target memory are applied in each cycle of the learning program. In other embodiments, the factors are injected for only one cycle, or only some of the cycles. For example, weight fluctuation injection only occurs at the beginning of the training phase, at the end of the training phase, or intermittently across the training phase.

The prediction errors are accumulated for the training data (556). A loss function (e.g. the loss function shown in FIG. 2) is computed over the accumulated prediction errors (557). Using the loss function, the next set of parameters is computed (558). The training algorithm loops back to step 553, where an adjusted set of parameters is produced using the "next set" produced at step 558, and the model for the target memory, for the next cycle of the training algorithm.

This process is iterated until the "next set" converges (560) according to the criteria of the training algorithm.

This flowchart illustrates logic executed by a computer system executing a training server program as described herein. The logic can be implemented using processors programmed using computer programs stored in memory accessible to the computer systems and executable by the processors, by dedicated logic hardware, including field programmable integrated circuits, and by combinations of dedicated logic hardware and computer programs. It will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

Figure 6:
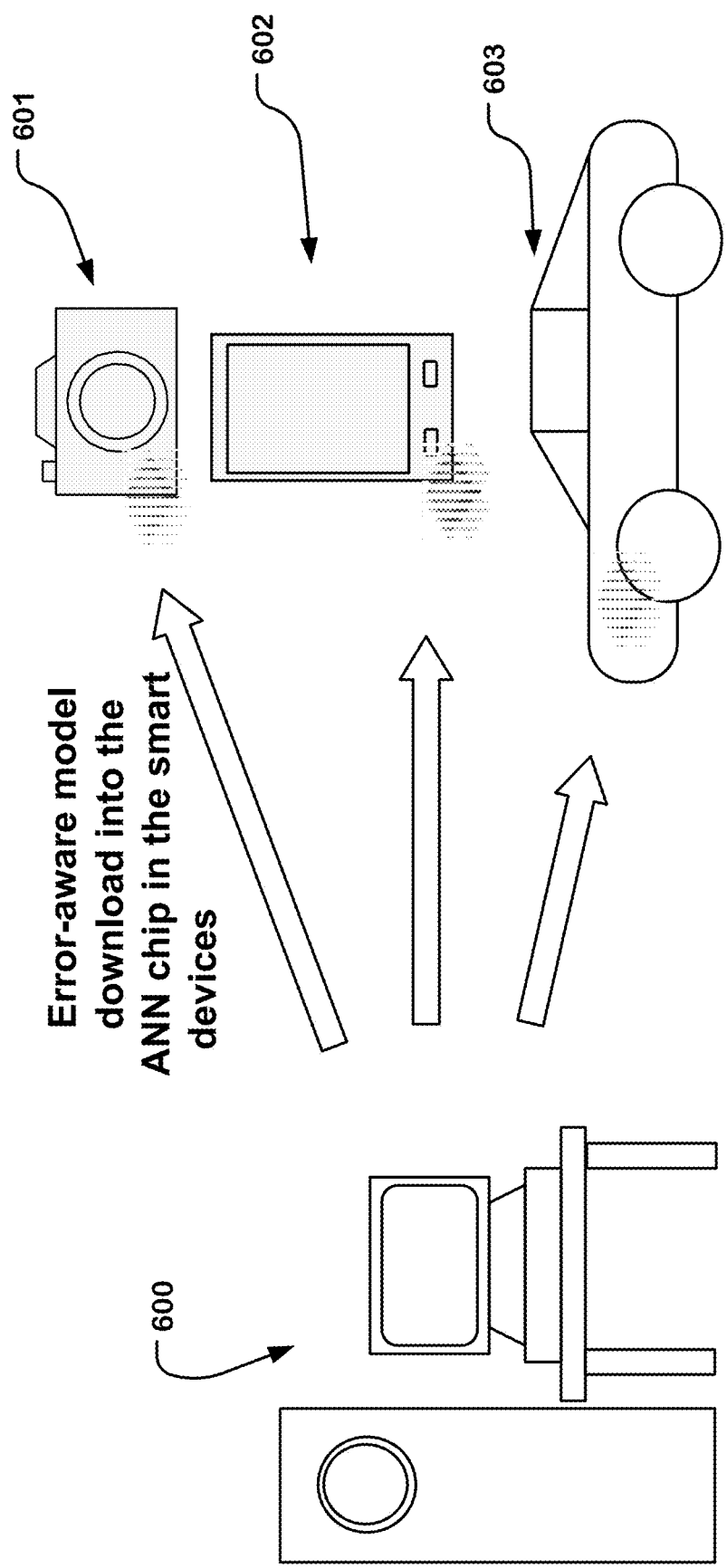
FIG. 6 illustrates embodiments of inference engines as described herein deployed in cameras, smart phones and automobiles.

FIG. 6 illustrates applications of the present technology deployed in inference engines suitable to be deployed in the field, such as in "edge device" in an internet of things model. For example, a training server 600 can be deployed to produce trained sets of memory error-aware model parameters for ANNs used in cameras 601, smart phone 602 and automobiles 603.

The technology described herein provides an ANN training algorithm which can tolerate the non-ideal behaviors of the memory devices, and thus achieve more stable ANN execution accuracy in inference engines.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for machine learning of parameters for artificial neural network computing using training data sets, comprising:
applying a sequence of input training data sets to a neural network to produce inference results for the sequence using a set of model parameters in the neural network combined with factors based on a model of non-ideal characteristics of target memory to provide a training set of model parameters;
computing errors between expected results for the training data set and the inference results for the sequence produced using the training set of model parameters to produce a loss function; and
applying a model parameter update procedure using the loss function to update the set of model parameters.

2. The method of claim 1, wherein the factors represent variability of the model parameters resulting from differences between target programmed states of memory cells in the target memory and output data of the memory cells.

3. The method of claim 1, wherein the factors comprise error factors within a distribution of errors derived from the model.

4. The method of claim 1, wherein the factors comprise randomized error factors within a distribution of errors derived from the model.

5. The method of claim 1, including storing the updated set of model parameters to a memory having non-ideal characteristics of the model.

6. The method of claim 1, including storing the updated set of model parameters to a memory in an inference engine, the model for the target memory compensating for non-ideal characteristics of the memory.

7. The method of claim 1, wherein the target memory is a nonvolatile memory.

8. The method of claim 1, including storing the updated set of model parameters to a memory in analog mode.

9. A data processing system for machine learning of model parameters for neuromorphic computing using training data sets with expected results, comprising:
a processor including memory storing instructions executable by the processor, the instructions configuring the processor to execute a process including:
applying a sequence of input training data sets to a neural network to produce inference results for the sequence using a set of model parameters in the neural network combined with factors based on a model of non-ideal characteristics of target memory to provide a training set of model parameters;
computing errors between the expected results and the inference results for the sequence produced using the training set of model parameters to produce a loss function; and
applying a model parameter update procedure using the loss function to update the set of model parameters.

10. The data processing system of claim 9, wherein the factors represent variability of the model parameters resulting from differences between target programmed states of memory cells in the target memory and output data of the memory cells.

11. The data processing system of claim 9, wherein the factors comprise error factors within a distribution of errors derived from the model.

12. The data processing system of claim 9, wherein the factors comprise randomized error factors within a distribution of errors derived from the model.

13. The data processing system of claim 9, including storing the updated set of model parameters to a memory having non-ideal characteristics of the model.

14. The data processing system of claim 9, including storing the updated set of model parameters to a memory in an inference engine, the model for the target memory compensating for non-ideal characteristics of the memory.

15. The data processing system of claim 9, wherein the target memory is a nonvolatile memory.

16. The data processing system of claim 9, wherein the target memory operates in analog mode.

17. A computer program product for machine learning of model parameters for neuromorphic computing using training data sets with expected results, comprising:
- non-transitory memory storing instructions executable by a processor, the instructions including logic to implement a method including:
- applying a sequence of input training data sets to a neural network to produce inference results for the sequence using a set of model parameters in the neural network combined with factors based on a model of non-ideal characteristics of target memory to provide a training set of model parameters;
- computing errors between the expected results and the inference results for the sequence produced using the training set of model parameters to produce a loss function; and
- applying a model parameter update procedure using the loss function to update the set of model parameters.

18. A device, comprising:
- logic to implement a neural network over input data and a trained set of model parameters; and
- memory storing the trained set of model parameters operably coupled to the logic, the trained set of model parameters having values computed using a training algorithm that compensates for non-ideal characteristics of the memory.

19. The method of claim 1, wherein the target memory is utilized by the artificial neural network.

20. The device of claim 18, wherein the memory is utilized by the neural network.

* * * * *